United States Patent [19]

Rouillard

[11] Patent Number: 6,106,633
[45] Date of Patent: Aug. 22, 2000

[54] METHOD OF PREVENTING DAMAGE TO BOTTLE LABELS AND COMPOSITION THEREOF

[75] Inventor: Carol Anne Rouillard, Loveland, Ohio

[73] Assignee: Diversey Lever, Inc., Plymouth, Mich.

[21] Appl. No.: 09/059,050

[22] Filed: Apr. 13, 1998

Related U.S. Application Data

[63] Continuation-in-part of application No. 08/839,406, Apr. 11, 1997, Pat. No. 5,849,095, which is a continuation-in-part of application No. 08/629,635, Apr. 9, 1996, abandoned.

[51] Int. Cl.⁷ ...................................................... C23G 1/02
[52] U.S. Cl. ........................................................... 134/3
[58] Field of Search ................................................... 134/3

[56] References Cited

U.S. PATENT DOCUMENTS

| B 520,546 | 3/1976 | Sorgenfrei et al. . |
| 2,419,805 | 4/1947 | Wegst et al. . |
| 2,425,907 | 8/1947 | Wegst et al. . |
| 2,447,297 | 8/1948 | Wegst et al. . |
| 3,669,893 | 6/1972 | Clarke et al. . |
| 4,110,262 | 8/1978 | Arnau et al. . |
| 4,201,688 | 5/1980 | May . |
| 4,230,592 | 10/1980 | Miller et al. . |
| 4,390,451 | 6/1983 | Havinga et al. . |
| 4,446,046 | 5/1984 | Becker . |
| 4,477,290 | 10/1984 | Carroll et al. . |
| 4,965,019 | 10/1990 | Schmid et al. . |
| 5,024,783 | 6/1991 | Busch et al. . |
| 5,084,198 | 1/1992 | Ahmed et al. . |
| 5,145,608 | 9/1992 | Wershofen . |
| 5,294,364 | 3/1994 | Thomas et al. . |
| 5,382,295 | 1/1995 | Aoki et al. . |
| 5,472,630 | 12/1995 | Ouyang et al. . |
| 5,536,884 | 7/1996 | Stoeckigt et al. . |
| 5,545,347 | 8/1996 | Ouyang et al. . |
| 5,622,569 | 4/1997 | Dennis et al. . |

FOREIGN PATENT DOCUMENTS

| 235 961 | 4/1987 | European Pat. Off. . |
| 1 443 570 | 9/1973 | United Kingdom . |

Primary Examiner—Kriellion Sanders

[57] ABSTRACT

Chemical deterioration of permanent applied ceramic or colored labels of bottles cleaned in a bottle washer is minimized by soaking the bottles in a highly caustic composition which does not include any phosphorus compounds, ethylene diamine tetraacetic acid or nitrilotriacetic acid. The soaking composition includes the sodium hydroxide dissolved in water, in combination with polycarboxylic acid crystal growth inhibitors. Preferably the soaking solution further includes a chelant such as a gluconate, glucoheptonate, or boroheptonate. The soaking solution can be added by either combining a liquid or powder built detergent composition which also forms a portion of the present invention or, alternately, an additive package, not including the sodium hydroxide, can be added.

14 Claims, No Drawings

METHOD OF PREVENTING DAMAGE TO BOTTLE LABELS AND COMPOSITION THEREOF

RELATED APPLICATIONS

This is a continuation-in-part of application Ser. No. 08/839,406 filed Apr. 11, 1997, now U.S. Pat. No. 5,849,095, which is a continuation-in-part of Ser. No. 08/629,635, filed Apr. 9, 1996, entitled "Anti-Etch Bottle Washing Solution," which is abandoned.

BACKGROUND OF THE INVENTION

Glass bottles, particularly those used for soft drinks and beer, are frequently reused. In order to reuse these, the bottle must be cleaned and sterilized once returned to the bottler. This is accomplished using a bottle washing apparatus which typically has three to five sections. The bottles are introduced to the machine and supported throughout the washing process by individual holders or pockets. Bottles are initially directed to a pre-rinse section which is designed to remove large particles and labels. In this section, water and residual chemicals from the cleaning process are directed at the bottles as they are introduced into the machine.

Next the bottles are conveyed into one or more cleaning or soaking sections where they are soaked in a highly caustic solution at an elevated temperature, generally about 70° C. or higher. Pressurized spraying of the wash solution onto and into the bottles may also occur in these section(s). After 7 to 15 minutes, the bottles are taken to a warm rinse, and then to a final potable water rinse. The final rinse water is then re-used for the subsequent initial pre-rinse.

The cleaning or soaking solution is a highly caustic solution. Generally, this contains 2–4% sodium hydroxide. This acts to clean the bottles, dissolve metals such as metal foils contained in the main label and the band label on the neck of the container. Also, in combination with temperature and contact time, this highly caustic solution renders the bottles commercially sterile.

Although some operators clean bottles with caustic by itself, this is generally unacceptable. Caustic alone is not an effective detergent and it is not free rinsing. Further, it will cause calcium and magnesium ions to precipitate out of solution in the form of salts. The resulting precipitate leaves spots on bottles and can accumulate on the equipment as a tenacious scale. Such scale reduces the efficiency of the bottlewasher and increases energy consumption by hindering heat transfer.

To improve rinsability and detergency, a surfactant(s) is generally added to the soaking solution. The surfactant(s) serves many purposes. It helps the caustic wet and penetrate the soil and aids in soil dispersion. Surfactants also prevent soil from redepositing back onto clean bottles, provide foam control and enhance overall cleaning.

To prevent calcium and magnesium precipitation, a combination of chemicals is used. Chelants are used, which bind to the cations and prevent them from reacting with other detergent components and precipitating out of solution. Typical chelants include ethylene diamine tetraacetic acid, nitrilotriacetic acid, complex phosphates and alkali metal salts thereof, as well as the alkali metal salts of gluconic acid.

Sequestrants are also used to prevent hardness precipitation. The primary sequestrants are the orthophosphates and phosphonates. Scale is also controlled through the use of crystal growth inhibitors. These are the polycarboxylic acids such as polyacrylic acid, polymethacrylic acid, polymaleic acid, and copolymers thereof. These also act as threshold inhibitors and play a very important role in the overall process. Residual polycarboxylic acid is carried from the warm rinse back over to the pre-rinse. Thus, it prevents scale formation in the pre-rinse section, as well as scale formation and spotting in the rinse sections.

The caustic bottlewash process is not only chemically aggressive on the glass but caustic solutions also severely deteriorate permanent labels conventionally used on bottles. Permanent labels are generally colored with heavy metal pigments and glass lead based frit. These labels, known in the industry as applied color labels or applied ceramic labels (ACLs) are vulnerable to attack by the caustic solutions which in turn leach the heavy metal pigments from the labels into the wash solution.

The attacked labels appear faded, blackened, lackluster and bled. This deterioration of the labels is undesirable for beverage and brewery bottle washers because of the negative impact it has on brand image, consumer appeal and quality of the beverage package. Conventionally, the bottles are washed up to about 50–100 wash trips before the bottles are discarded or lost in trade. When the applied color labels deteriorate during these trips the bottles must be discarded before the end of their useful lives. Some bottle washers/manufacturers elect to use paper labels rather than the ACLs to extend the lives of the reused bottles. Additionally, it is possible for the leached metal pigments to redeposit onto or into the glass bottles posing a risk for contamination of consumable beverages.

SUMMARY OF THE INVENTION

The present invention is premised on the realization that a caustic bottle washing solution can be formed which significantly prevents deterioration or damage to permanent color or ceramic labels applied to glass bottles. More particularly, the present invention is premised upon the realization that a highly caustic bottle washing solution which deters the leaching of heavy metal pigments from the labels can be formed from sodium hydroxide, in combination with a crystal growth inhibitor and substantially free from several compounds found to promote deterioration of the labels. These compounds include certain chelants and sequestrants typically used in glass washing compositions, and specifically ethylene diamine tetraacetic acid, nitrilotriacetic acid, and phosphorous compounds including the phosphates and higher concentrations of the phosphonates. By providing a soaking solution which includes caustic and crystal growth inhibitor, but does not include the EDTA, NTA, phosphates or high concentrations of phosphonates, a highly effective glass washing solution is provided which does not promote caustic deterioration of the permanent color or ceramic labels used on glass bottles.

The present invention can further include surfactants and certain chelants, which also inhibit the deterioration or damage to the ACLs. The surfactants may include nonphosphated, nonionic surfactants such as alkyl polyglycosides. Additional nonionic surfactants which are useful and known in the art include modified fatty alcohol, polyglycol ethers, modified polyethoxylated straight chain alcohols, amine polyglycol condensates, fatty alcohol alkoylated alcohol, alkoylated alkyl polyoxyethyethylene ethers, and mixtures thereof.

Suitable chelants include gluconic acid and its salts, as well as alkali metal glucoheptonates and alkali metal boroheptonates.

By employing this chemistry, one can provide an effective bottle washing solution which minimizes damage to the permanent labels. This, in turn, will prolong the useable life of the bottle and minimize the likelihood that leached heavy metal pigments would redeposit onto or into the bottles. An additional advantage is realized in that all of these label promoting materials contribute to the washing process.

The objects and advantages of the present invention will be further appreciated in light of the following detailed description.

DETAILED DESCRIPTION OF THE PREFERRED EMBODIMENTS

The present invention encompasses bottle washing compositions, bottle washing solutions, as well as the process of washing bottles. The bottle washing solution refers to the caustic solution actually present in a bottle washer. The bottle washing solution is formed by combining bottle washing composition(s) with water.

The bottle washing apparatus will generally have a volume of water to which the bottle washing composition, i.e., sodium hydroxide and other chemicals, are added to form the bottle washing solution. The formed bottle washing solution will generally include 1–8.0% by weight of caustic, preferably 1–4%. Although potassium hydroxide can be used, sodium hydroxide is preferred because of its increased alkalinity and generally lower cost.

In addition to the sodium hydroxide, the bottle washing solution will include a crystal growth inhibitor. This will act to prevent leaching of the heavy metal pigments, such as zinc, aluminum, beryllium, lead, cadmium and a mixture thereof out of the label and will promote easier rinsing of the bottlewash solution. It also has the added advantage of providing threshold inhibition in the warm rinse section due to solution carryover from the soak tank, which further provides threshold inhibition in the pre-rinse section of the washer since water from the warm rinse section is redirected back to the pre-rinse.

The crystal growth inhibitor is a low molecular weight polycarboxylic acid or salt thereof. The polycarboxylic acid can include polyacrylic acid, polymethacrylic acid and polymaleic acid and copolymers or terpolymers thereof. Generally, the average molecular weight of these polymers will be from about 1000 to about 100,000. The determining factor with respect to molecular weight is primarily the ability of the polymer to dissolve in the soaking solution.

Generally, 25–2000 ppm of the polymer will be present in the soaking solution, and preferably 50 to 1000 ppm. Preferred crystal growth inhibitors include Acusol 505N which is an acrylic acid, maleic acid copolymer salt having an average molecular weight of about 40,000. This is sold by Rohm & Haas as a 35% solid solution. A second preferred crystal growth inhibitor is Accusol 479N which is also an acrylic acid, maleic acid copolymer sodium salt having an average molecular weight of about 70,000, also sold by Rohm & Haas as a 40% solid solution. A third preferred polycarboxylic acid is Alcosperse 408, which is a polyacrylic acid (sodium anionic terpolymer), 3000 average molecular weight, sold by Alco as a 43% solid solution. Dry versions of the above can also be employed for powdered formulation, adjusting concentrations to account for the fact that the dry versions are more active on a per weight basis.

The soaking solution should further include a surfactant which does not promote deterioration of the ACLs and in an amount effective to improve soil dispersion. Non-deteriorating surfactants include the nonionic surfactants and in particular the polyalkylglucosides. These actually inhibit caustic attack on the ACLs. Preferably, the washing solution will have 100–2500 ppm polyalkylglucoside (active), preferably 200–2000 ppm. One preferred polyalkylglucoside is Glucopon 425 CS which is a 50% active solution. Phosphate-containing surfactants tend to promote deterioration of the ACLs and should not be employed.

The soaking solution can also include various anionic and amphoteric surfactants to promote solution stability. Typical anionic and amphoteric surfactants include lauryl sulfate, sodium xylene sulfonate, toluene sulfonic acid and salts thereof, sulfosuccinate salts, fatty acids and their salts, and the imidazolines. These are used as hydrotropes and could be present in a liquid solution at a concentration of 0–20% by weight.

In addition, the soaking solution will preferably include a chelating agent. It is very important that the chelating agent not be ethylene diamine tetraacetic acid or nitrilotriacetic acid. Both of these materials which are commonly used in bottle washing solutions promote destruction of glass and ACLs. Preferably, the chelating agent will be gluconic acid or a water-soluble salt thereof, an alkali metal glucoheptonate, or an alkali metal boroheptonate. About 50–2000 ppm of the chelating agent should be present in the soaking solution, with at least about 200 ppm being preferred.

As previously mentioned, the soaking solution should be substantially free of certain chemicals which are typically used in bottle washing solutions. These are chemicals which further accelerate deterioration of the ACLs. Specifically, the present invention should not include any phosphate-containing materials such as sequestrants, fillers or other compositions. Further, phosphonate concentration should be less than 2000 ppm. Phosphonates actively deter deterioration of the applied labels at concentrations of 5 to about 1000 ppm. Phosphonates are acceptable at higher concentrations in the rinse section due to the mild pH.

Concentrations at or above those listed in Table 1 have been shown to accelerate caustic attack on the applied labels. This is for one component. If combinations of such compositions are present, lower concentrations will also cause label damage because of heavy metal pigment leaching. Preferably, no detectable amounts of these compositions will be present in the washing solution.

TABLE 1

| CONCENTRATION OF DETERIORATION ACCELERATORS USING SINGLE INGREDIENTS | |
|---|---|
| MATERIAL | CONC. (PPM) |
| EDTA | 100 |
| SODIUM TRIPOLYPHOSPHATE | 100 |
| TRISODIUM PHOSPHATE | 100 |
| PHOSPHORIC ACID | 75 |
| ALCOHOL ALKOXYLATE PHOSPHATE ESTER | 400 |

The soaking solution can be formed by adding the individual components separately to the water in the bottle washer or all of the components can be combined in desired proportions and added to the water. The bottle washing composition may include the NaOH or the NaOH can be purchased and added separately. Further, the bottle washing composition can be formulated as a liquid or a powder.

An all-in-one powder formulation which incorporates the sodium hydroxide will include at least 60%, and preferably 80–90%, sodium hydroxide, in combination with 0.1% to about 5% crystal growth inhibitor, and optionally 0 to 10% and preferably at least 0.5% chelant, 0 to 10% and preferably at least 0.1% nonionic surfactant, and 0 to 20% filler. The filler, in this case, can be compositions such as sulfates, bicarbonates, limited amounts of carbonate and the like. As previously indicated, the composition will not include NTA, EDTA, or any phosphate. The recommended use concentration of this composition in the soaking solution would be about 1.5% to 5% w/v. Preferred formulations are shown in Table 2.

TABLE 2

EXEMPLARY FORMULAS FOR BUILT POWDERED PRODUCT

| MATERIAL: | FORMULA 1 | FORMULA 2 | FORMULA 3 |
|---|---|---|---|
| SODIUM HYDROXIDE, BEADS | 88.00 | 87.00 | 87.00 |
| SODIUM GLUCONATE | 8.00 | 0.67 | 0.67 |
| ACUSOL 505ND, 92% ACTIVE | 1.00 | 0 | 0 |
| ALCOSPERSE 408D | 0 | 0.15 | 0.15 |
| DEQUEST 2016D | 0 | 0.29 | 0.29 |
| SODIUM SULFATE | 0 | 9.55 | 11.55 |
| SODA ASH, GRADE 100 | 1.80 | 2.00 | 0 |
| TRITON 98/375 NONIONIC SURFACTANT | 1.20 | 0 | 0 |
| PLURAFAC LF 431 | 0 | 0.34 | 0.34 |
| RECOMMENDED USE % W/V | 3.40 | 3.60 | 3.60 |

An all-in-one liquid composition will include at least about 30% of a 50% solution of sodium hydroxide (and preferably 80% of a 50% solution), along with 0.1% to about 5% crystal growth inhibitor, 0 to about 10% chelant, preferably at least 1%, and 0 to about 10%, preferably at least 0.1%, nonionic surfactant. These are simply blended together to form a stable liquid solution, emulsion or dispersion. Again, no NTA, EDTA or phosphates are included. This composition should be used at a concentration of 2–10% V/V. Typical formulations are shown in Table 3.

TABLE 3

EXEMPLARY FORMULAS FOR BUILT LIQUID PRODUCT

| MATERIAL | FORMULA 4 | FORMULA 5 |
|---|---|---|
| SODIUM HYDROXIDE, 50% LIQUOR | 91.79 | 87.00 |
| SODIUM GLUCONATE, 45% LIQUOR | 7.50 | 7.50 |
| ACUSOL 505N, 35% ACTIVE | 0.50 | 0.50 |
| TRITON BG 10, 70% ACTIVE | 0.14 | 0 |
| DEHYPON LT 104 | 0 | 5.00 |
| TRITON DF 16 | 0.07 | 0 |
| RECOMMENDED USE % v/v | 6.70 | 6.90 |

In use, these would simply be added to fresh water in the soaking portion of the bottle washing apparatus, or will be added to the soaking portion of the bottle washing apparatus as make-up water is added, or when concentration probes indicate the need for additional caustic to maintain the desired concentration. The bottle washer would then be operated in its usual manner, generally soaking the bottles with the caustic solution for 7–15 minutes at 60–80° C.

In addition to using an all-in-one composition, operators of bottle washers frequently add caustic separately and add the water treatment and detergent system as a package. Accordingly, a liquid solution of additives without caustic will preferably include about 0 to 20% chelant, preferably gluconic acid or salts thereof, 0 to 10% nonionic surfactant, and at least about 1–10% crystal growth inhibitor. Preferably, this will include at least about 20% sodium gluconate, at least about 4% nonionic surfactant, and at least about 5% crystal growth inhibitor, all on a by-weight basis. Typical formulations for liquid additives are shown in Table 4. Formulas 13–15 do not include caustic and are designed only to inhibit or substantially prevent the deterioration of the applied color or ceramic labels on bottles. Formulas 6–13 are complete detergent additive formulations.

TABLE 4

EXEMPLARY FORMULAS FOR LIQUID ADDITIVES

| MATERIAL | FORMULA 6 | FORMULA 7 | FORMULA 8 | FORMULA 9 | FORMULA 10 | FORMULA 11 |
|---|---|---|---|---|---|---|
| WATER | 71.00 | 60.60 | 28.00 | 68.50 | 60.50 | 66.00 |
| KOH, 45% | | | | | 10.00 | |
| Sodium Gluconate, 45% liquor | | | | | | |
| Sodium gluconate, 100% powder | 20.00 | 10.00 | | 10.00 | 10.00 | 20.00 |
| Alcosperse 408 | | 5.00 | 10.00 | 5.00 | | |
| Acusol 479N | | | | | 5.00 | |
| Acusol 505N | 5.00 | | | | | 5.00 |
| Gluconic Acid, 50% | | | 40.00 | | | |
| Triton BG 10 | | | | | | 3.00 |
| Triton CG 110 | 2.00 | | | | | |
| Dequest 2000 | | 5.00 | 10.00 | 5.00 | 5.00 | |
| Cumene Sulfonic Acid, 65% | | 9.4 | | 6.50 | | |
| Triton DF 12 | | | 10.00 | | | |
| Mona NF 10 | 2.00 | | 2.00 | | | 6.00 |
| Dehypon LT104 | | | | 5.00 | | |
| Plurafac LF 431 | | | 10.00 | | 5.00 | |
| Emery 6358 | | | | | 4.50 | |
| Recommended use % v/v | 0.1–0.4 | 0.1–0.4 | 0.1–0.2 | 0.1–0.4 | 0.2–0.4 | 0.1–0.4 |

TABLE 4-continued

EXEMPLARY FORMULAS FOR LIQUID ADDITIVES

| MATERIAL | FORMULA 12 | FORMULA 13 | FORMULA 14 | FORMULA 15 | FORMULA 16 |
|---|---|---|---|---|---|
| WATER | | 60.5 | 75.00 | 95.00 | 50.00 |
| KOH, 45% | | 10.0 | | | |
| Sodium Gluconate, 45% liquor | 44.0 | | 20.00 | | |
| Sodium gluconate, 100% powder | | 10.0 | | | |
| Alcosperse 408 | | 5.0 | | | |
| Acusol 479N | | | | | |
| Acusol 505N | 20.0 | | 5.00 | 5.00 | 50.00 |
| Gluconic Acid, 50% | | | | | |
| Triton BG 10 | 12.0 | | | | |
| Triton CG 110 | | | | | |
| Dequest 2000 | | 5.0 | | | |
| Cumene Sulfonic Acid, 65% | | | | | |
| Triton DF 12 | | | | | |
| Mona NF 10 | 24.0 | | | | |
| Dehypon LT104 | | | | | |
| Plurafac LF 431 | | 5.0 | | | |
| Emery 6358 | | 4.5 | | | |
| Recommended use % v/v | 0.1 | 0.1–0.4 | 0.1–0.4 | 0.1 | 0.01–0.1 |

NOTE:
Built Liquid & Powdered Products: Provide causticity, detergents, hardness control and prevent ACL deterioration.
Complete Additives: Provide detergents, hardness control and prevent ACL deterioration.
Anti-ACL deterioration Additive: Meant to provide only anti-ACL deterioration ingredients. May be used with normal detergent additives.

A powder additive composition, i.e., without caustic, should include basically the same components, i.e., 0–20% chelant, 0–20% nonionic surfactant, 0–10% crystal growth inhibitor. These compositions were formulated as shown in Table 5.

TABLE 5

EXEMPLARY FORMULAS FOR COMPLETE POWDERED ADDITIVES

| MATERIAL | TYPICAL RANGE | Formula 17 |
|---|---|---|
| Soda Ash, grade 100 | 0–50 | 5.00 |
| Sodium Sulfate | 0–50 | 30.00 |
| Triton BG 10 | 0–10 | |
| Plurafac LF 431 | 0–10 | 5.00 |
| Sodium gluconate 100% powder | 0–60 | 50.00 |
| Acusol 479 ND | 0–10 | |
| Acusol 505 ND | 0–10 | 10.00 |
| Recommended use % w/v | 0.1–0.25% | 0.05–0.4% |

In order to test the formulations listed in Formulas 1 through 5, these were combined with water at the concentration listed in the Table 6 below. The concentration was determined by the need for 3% sodium hydroxide in the wash bath. For additives (6–17), a typical dosing concentration range of 0.01–0.4% was used since this is the typical level used and preferred for bottle-wash additives. The additives were tested in a 3% solution of sodium hydroxide, often times with addition of 0.5% wt. sodium carbonate.

TABLE 6

| | Concentration |
|---|---|
| Formula 1 | 3.4% w/w |
| Formula 2 | 3.6% w/w |
| Formula 3 | 3.6% w/w |
| Formula 4 | 6.7% v/v |
| Formula 5 | 6.0–6.9% v/v |
| Formula 6 | 0.1–0.4% v/v |
| Formula 7 | 0.1–0.5% v/v |
| Formula 8 | 0.1–0.2% v/v |
| Formula 9 | 0.1–0.4% v/v |
| Formula 10 | 0.2–0.4% v/v |
| Formula 11 | 0.1–0.4% v/v |
| Formula 12 | 0.1% v/v |
| Formula 13 | 0.1–0.4% v/v |
| Formula 14 | 0.1–0.4% v/v |
| Formula 15 | 0.1% v/v |
| Formula 16 | 0.01–0.1% v/v |
| Formula 17 | 0.05–0.4% w/w |

In order to test these solutions, in the laboratory a simple soak method employing virgin beverage bottles bearing permanent ceramic labels is used to verify. Four liters of each solution is prepared in heat resistant, non-glass containers and heated quickly to 71° C. For each test solution, one bottle is filled with and then submerged into the test solution. The bottles are then held in the test solution for 72 hours. Bottles are removed at desired times, such as 24, 48 or 72 hours. After removal from the solutions, bottles are washed with a mild detergent and allowed to air dry.

The appearance of the ACL labels are visually evaluated noting the condition of the gloss and the intensity and shade of the color. Test bottles are compared against untreated bottles, control bottles treated with caustic alone and bottles treated with traditional bottlewash solutions containing additives.

For example, formula #13 was tested at 3% w/w NaOH and compared to caustic with no additive, and caustic with a competitive traditional bottlewash additive. After 24 hours, bottles treated with no additive and traditional additive exhibited readily detectable loss of gloss and fading of color on the ACL decorations. The result was more apparent after 48 hours, and still more dramatic after the longest exposure time of 72 hours. In all cases, the bottles treated with experimental formulation retained gloss and color on the ACL decoration, and had no evidence of blackening. The most intense color had a very slight loss of intensity, almost undetectable to the naked eye. After 72 hours in the traditional additive, the label had no gloss, significantly faded color, and was dark gray in many areas, indicating leaching of pigments.

Thus, the inventive formulations substantially prevent damage to ACLs, and further actually act to inhibit leaching of heavy metal pigments by the sodium hydroxide. This, in turn, extends the life of the bottles and maintains the brand image, consumer appeal and quality of the beverage package.

This has been a description of the present invention, along with the preferred method of practicing the invention presently known to the inventor. However, the invention itself should be defined only by the appended claims wherein we claim:

In the claims:

1. A method of preventing damage to applied ceramic labels on bottles during cleaning comprising the step of soaking bottles with applied ceramic labels in a wash solution containing from about 1% to about 8.0% sodium hydroxide and at least about 25 ppm of a polycarboxylic acid crystal growth inhibitor wherein said solution contains less than 100 ppm phosphate compound, less than 100 ppm of either EDTA or NTA, and less than 2000 ppm phosphonate composition to substantially prevent damage to the applied ceramic labels.

2. A method according to claim 1 wherein the soaking step substantially prevents leaching of heavy metals from the applied ceramic labels for at least 50 wash trips.

3. A method according to claim 2 wherein the heavy metals are selected from the group of zinc, aluminum, beryllium, lead, cadmium, and mixtures thereof.

4. The method according to claim 1 wherein said solution further includes at least about 50 ppm of a chelant selected from the group consisting of gluconates, glucoheptonates, and boroheptonates.

5. A powdered bottle washing composition which substantially prevents damage to applied ceramic labels on bottles during cleaning, the composition being substantially free of phosphate, ethylene diamine tetraacetic acid, and nitrilotriacetic acid, and including at least about 60% sodium hydroxide and at least about 0.1% carboxylic acid crystal growth inhibitor.

6. The composition according to claim 5 further comprising from about 0.5 to about 10% of a chelant selected from the group consisting of gluconates, glucoheptonates and boroheptonates.

7. The composition according to claim 6 wherein said composition further includes from about 0.1% to about 10% of a nonionic surfactant.

8. A liquid bottle washing composition for preventing damage to applied ceramic labels on bottles during cleaning, the composition comprising from about 30% to about 50% of sodium hydroxide, and from about 0.1% to about 5% of a polycarboxylic acid crystal growth inhibitor wherein said composition is substantially free of phosphates, ethylene diamine tetraacetic acid and nitrilotriacetic acid.

9. The liquid bottle washing composition according to claim 8 further comprising from about 1% to about 10% of a chelant selected from the group consisting of gluconates, glucoheptonates and boroheptonates.

10. The liquid bottle washing composition according to claim 8 wherein said composition further includes from about 0.1% to about 10% of a nonionic surfactant.

11. The liquid bottle washing composition according to claim 8, further comprising a surfactant selected from the group consisting of polysorbates, iminodipropionates, carboxylated linear alcohol, alkoxylates, anionic glucoesters, disodium cocoamphodiacetates, and disodium cocoamphocarboxylglycinates.

12. An additive for a bottle cleaning solution which substantially prevents damage to applied labels on bottles during cleaning, the composition comprising an effective concentration of a polycarboxylic acid crystal growth inhibitor, in combination with an effective concentration of a nonionic surfactant, wherein said additive is substantially free of phosphate compounds, EDTA and NTA.

13. The additive according to claim 12 further comprising a chelant selected from the group consisting of gluconates, glucoheptonates and boroheptonates.

14. A bottle-washing composition which substantially prevents damage to applied ceramic labels on bottles during cleaning, comprising an effective amount of sodium hydroxide with an effective concentration of at least one of the compositions selected from the group consisting of polysorbates, disodium tallow, amino diproprionate, disodium cocoamphodiacetate, carboxylated linear alcohol alkoxylates, phosphono, 1, 2, 4 butane tricarboxylic acid, anionic glucoester, gluconate, glucoheptonate, and polyalkylgluconate, wherein said bottle-washing solution is substantially free of EDTA, sodium tripolyphosphate, trisodium phosphate, phosphoric acid, and alcohol alkoxylate phosphate ester.

* * * * *